US008875355B2

(12) United States Patent
Sartin (10) Patent No.: US 8,875,355 B2
(45) Date of Patent: Nov. 4, 2014

(54) BUCKLE

(75) Inventor: Sean H. Sartin, Ridgeland, MS (US)

(73) Assignee: Sean H. Sartin, Ridgeland, MS (US)

( * ) Notice: Subject to any disclaimer, the term of this patent is extended or adjusted under 35 U.S.C. 154(b) by 427 days.

(21) Appl. No.: 13/312,589

(22) Filed: Dec. 6, 2011

(65) Prior Publication Data

US 2013/0139301 A1 Jun. 6, 2013

(51) Int. Cl.
*A41F 9/00* (2006.01)
*A44B 11/24* (2006.01)
*F16B 45/02* (2006.01)

(52) U.S. Cl.
CPC .................. *A44B 11/24* (2013.01); *F16B 45/02* (2013.01)
USPC ............ 24/178; 24/163 R; 24/163 K; 24/320; 24/377

(58) Field of Classification Search
CPC ................................. F16B 45/02; A44B 11/24
USPC ........... 24/178, 180, 188, 191, 189, 318, 319, 24/320, 377, 588.11, 163 K, 163 R; 2/321
See application file for complete search history.

(56) References Cited

U.S. PATENT DOCUMENTS

| 760,171 | A | | 5/1904 | Atwell | |
|---|---|---|---|---|---|
| 1,226,316 | A | * | 5/1917 | Depollier | 24/163 R |
| 2,805,459 | A | * | 9/1957 | Champagne | 24/178 |
| 2,897,559 | A | * | 8/1959 | Erdmann | 24/320 |
| 3,999,251 | A | * | 12/1976 | Payant | 24/188 |
| 4,577,374 | A | | 3/1986 | Lii | |
| 4,858,283 | A | * | 8/1989 | Takeuchi | 24/178 |
| 6,189,651 | B1 | | 2/2001 | Sadeck | |
| D448,655 | S | | 10/2001 | Lai | |
| 6,363,244 | B1 | | 3/2002 | McGhee | |
| 6,481,528 | B2 | | 11/2002 | Antonio | |
| 7,181,808 | B1 | * | 2/2007 | Van Winkle | 24/191 |
| 7,640,895 | B2 | | 1/2010 | Fountoulakis et al. | |
| D609,078 | S | | 2/2010 | Kelleghan | |
| D628,873 | S | | 12/2010 | Kelleghan | |
| D642,895 | S | | 8/2011 | Kelleghan | |
| 2009/0276983 | A1 | | 11/2009 | Chan | |
| 2011/0067648 | A1 | | 3/2011 | Siklosi | |

OTHER PUBLICATIONS

"Key Chain Carabiner Buckle", <URL: http://www.sourcingmap.com/metal-portable-key-chain-carabiner-buckle-hook-keyring-green-p-57976.html>; 2 pages; printed Nov. 11, 2011.
"Leather Carabiner Belt", <URL: http://www.peepculture.com/tss-leather-carabiner-belt/>; 3 pages; printed Nov. 11, 2011.

* cited by examiner

*Primary Examiner* — Robert J Sandy
(74) *Attorney, Agent, or Firm* — IP Law Leaders PLLC (57) ABSTRACT

A buckle designed to have the dual properties of a belt buckle and a carabiner. The buckle includes a buckle body with first and second buckle body ends and a gap therebetween. A gate extends between the first and second buckle ends, which is pivotally mounted to the first end of the buckle body. The gate is moveable between open and closed positions, such that when the gate is in a closed position it extends between the first and second buckle body ends. The buckle includes a means for holding the gate in a closed position against the second end of the buckle body. The buckle further includes a prong connected to the rear end of the buckle, which extends towards the front end of the buckle.

20 Claims, 8 Drawing Sheets

BUCKLE

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention is directed to a belt that performs the dual function of a carabiner and a belt buckle.

BACKGROUND OF THE INVENTION

As noted in U.S. Pat. No. 7,143,483 issued to Potzman, a buckle is a device that typically secures the two ends of a belt, or strap, together. Generally, the buckle is secured to one end of the belt, and the other end of the belt may be secured to the buckle in a variable manner. Commonly, the other end of the belt has holes along a portion of the belt length that allow a prong of the buckle to secure to the belt at differing lengths. In this manner, the belt may encircle the person's waist and accommodate girth of the waist, which may vary somewhat on a particular day, and between particular people. The same buckle may be used in certain instances where the buckle is removable from the belt. However, in certain other cases, the buckle and belt are permanently affixed.

U.S. Patent Publication Number 20080289187 describes a pair of scissors having a pair of looped handles with a carabiner-style inwardly-opening gate mounted on the outer-most perimeter of one or both of the looped handles. The distal end of each gate, distal from the gates hinge, is oppositely disposed relative to the fulcrum of the pair of scissors. The non-gate portion of each of the looped handles containing a gate includes a hooked portion adjacent the distal end of each gate. The hooked portion includes a stop to limit movement of the gate.

U.S. Design Pat. Nos. D642895, D609078 and D628873 all issued to Kelleghan shows a carabiner in combination with a buckle but not of the type claimed in the present invention. Likewise with respect to U.S. Design Pat. No. D448655 issued to Lai.

None of the above inventions and patents, taken either singly or in combination, is seen to describe the instant invention as claimed.

SUMMARY OF THE INVENTION

A buckle designed to have the dual properties of a belt buckle and a carabiner, comprising: a buckle body having first and second buckle body ends with a gap therebetween; a gate moveable between open and closed positions, the gate defining first and second gate ends, wherein when the gate is in the closed position the gate extends between the first and second buckle body ends; a means for pivotally mounting the first end of the gate to the first end of the buckle body; a means for holding the gate in a closed position against the second end of the buckle body; and a prong.

BRIEF DESCRIPTION OF THE DRAWINGS

Similar reference characters denote corresponding features consistently throughout the attached drawings.

DETAILED DESCRIPTION OF THE INVENTION

This invention is directed to a buckle 100 that performs the dual function of a carabiner and a belt buckle. The buckle 100 of the invention can be supplied separately, i.e., without being attached to a belt, or the buckle can be supplied already attached to a belt.

Referring to FIGS. 1 through 3A, the buckle 100 comprises a buckle body 120. The buckle body 120 defines rear and front ends 140 and 160, respectively. The buckle body 120 includes first and second buckle body ends 180 and 200, respectively. The first and second buckle body ends 180 and 200 define a gap 220 therebetween. The buckle 100 further comprises a gate 240, which is moveable between open and closed positions. The gate 240 defines first and second opposite gate ends 260 and 280, respectively. When the gate 240 is in the closed position the gate 240 extends between the first and second buckle body ends 180 and 200 thereby blocking gap 220. The gate 240 preferably opens inwardly with respect to the buckle body 120.

Figure 1:
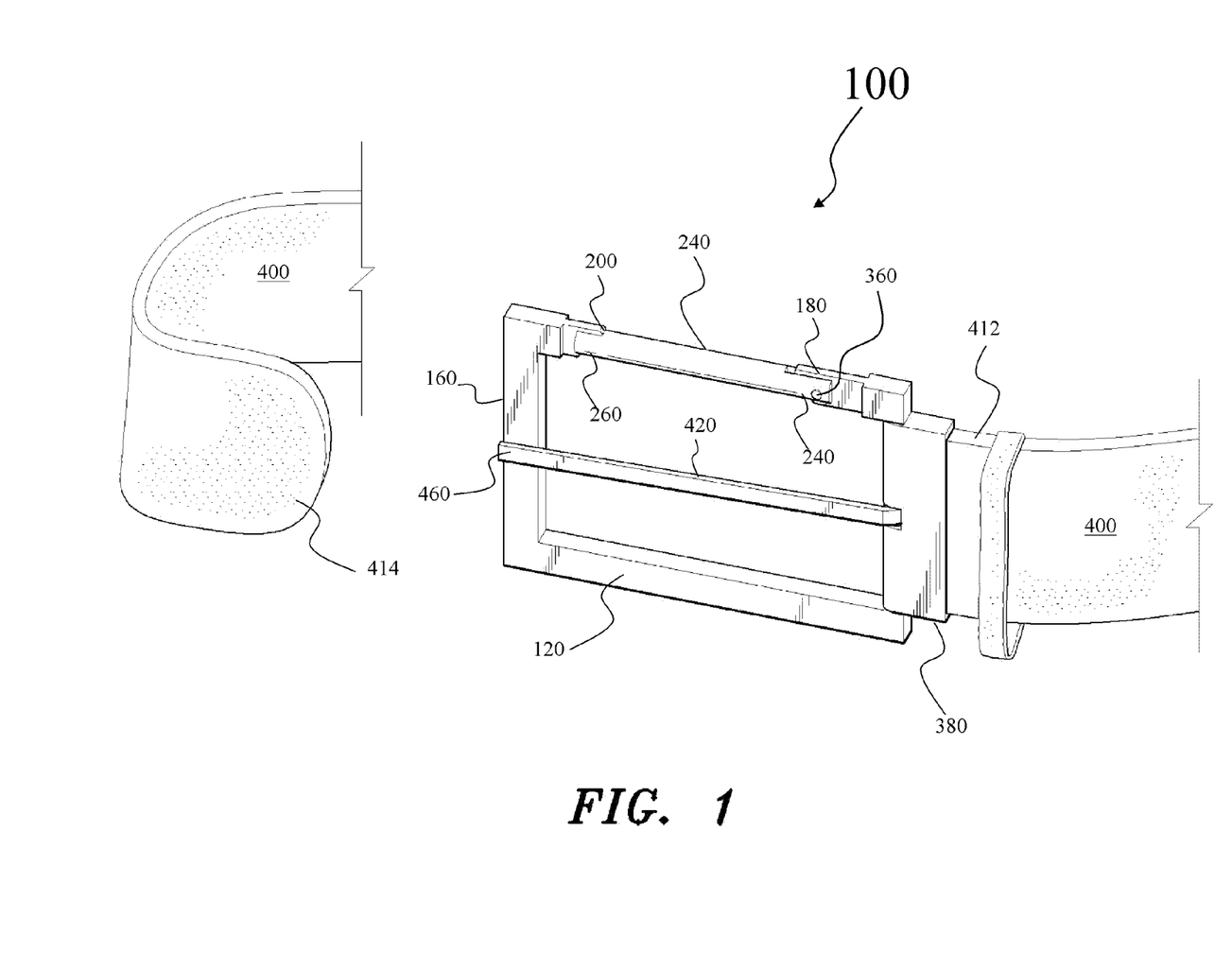
FIG. 1 is an environmental perspective view of a buckle according to the present invention.
Figure 2:
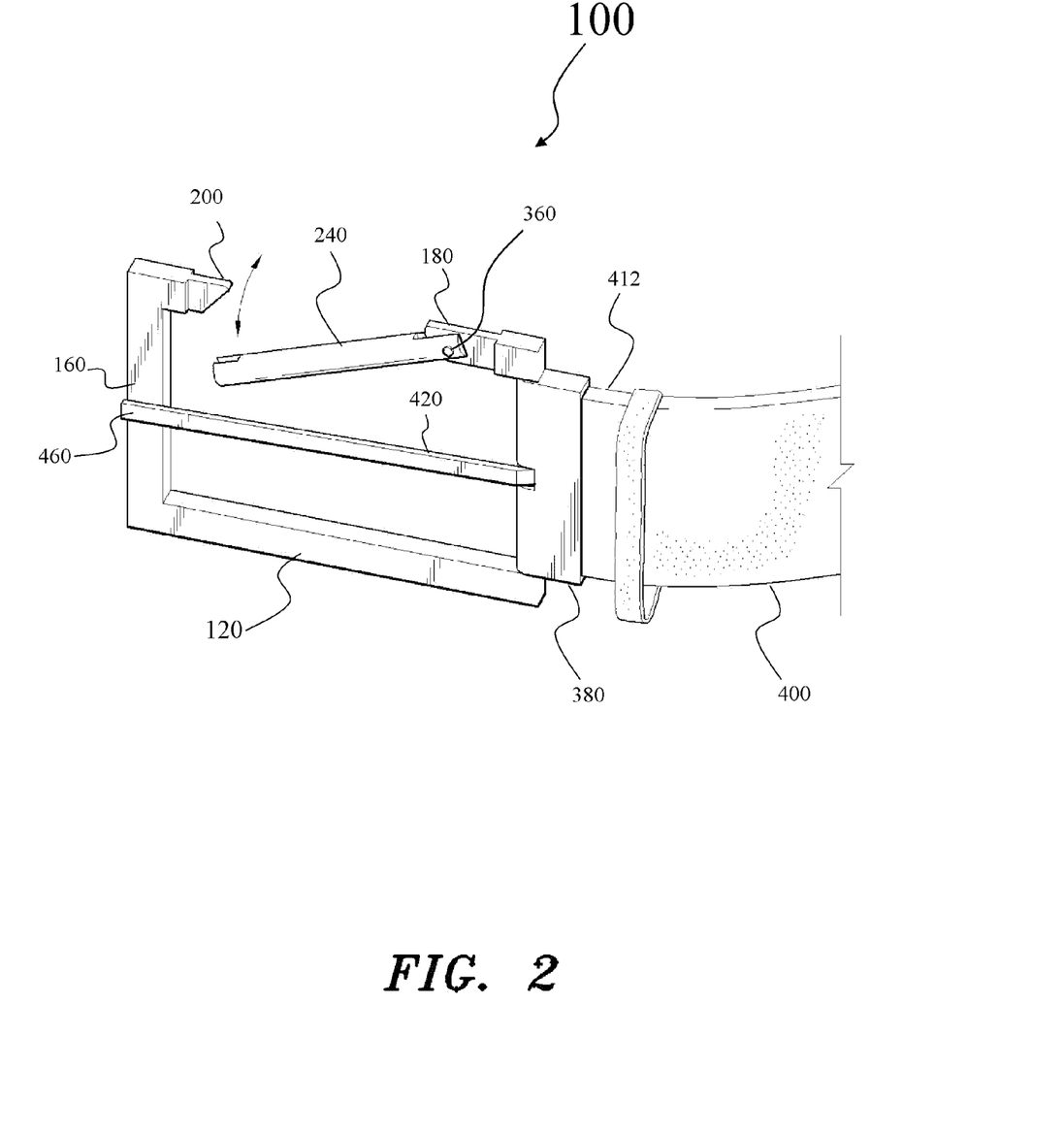
FIG. 2 shows the buckle of FIG. 1 with an open gate.

The first end 260 of gate 240 is pivotally attached to the first buckle body end 180 which allows gate 240 to be opened inwardly and in the same plane with respect to buckle body 120 (see FIG. 2). The second end 280 of gate 240 sits against the second buckle body end 200 when gate 240 is in its closed position. In one embodiment the gate 240 is biased by a spring 300 (shown in FIG. 3) to pivot to its closed position about axis 320. A gate attachment member 360 can be used to pivotally attach the first end 260 of gate 240 to the first buckle body end 180 (see FIG. 3). The gate attachment member 360 can be, for example, a rivet or pin aligned along axis 320 (see FIG. 3).

In one embodiment the buckle 100 further comprises a base component 380. In this embodiment, the rear end 140 of buckle body 120 is operably connected to the base component 380. In normal use the base component 380 of buckle 100 is connected to a belt 400 (see, e.g., FIG. 1). The belt 400 can be a trouser belt (synonymous with the term "pants" or "slacks" belt in the USA). However, the belt 400 can be, for example, a dog or cat collar.

Figure 3:
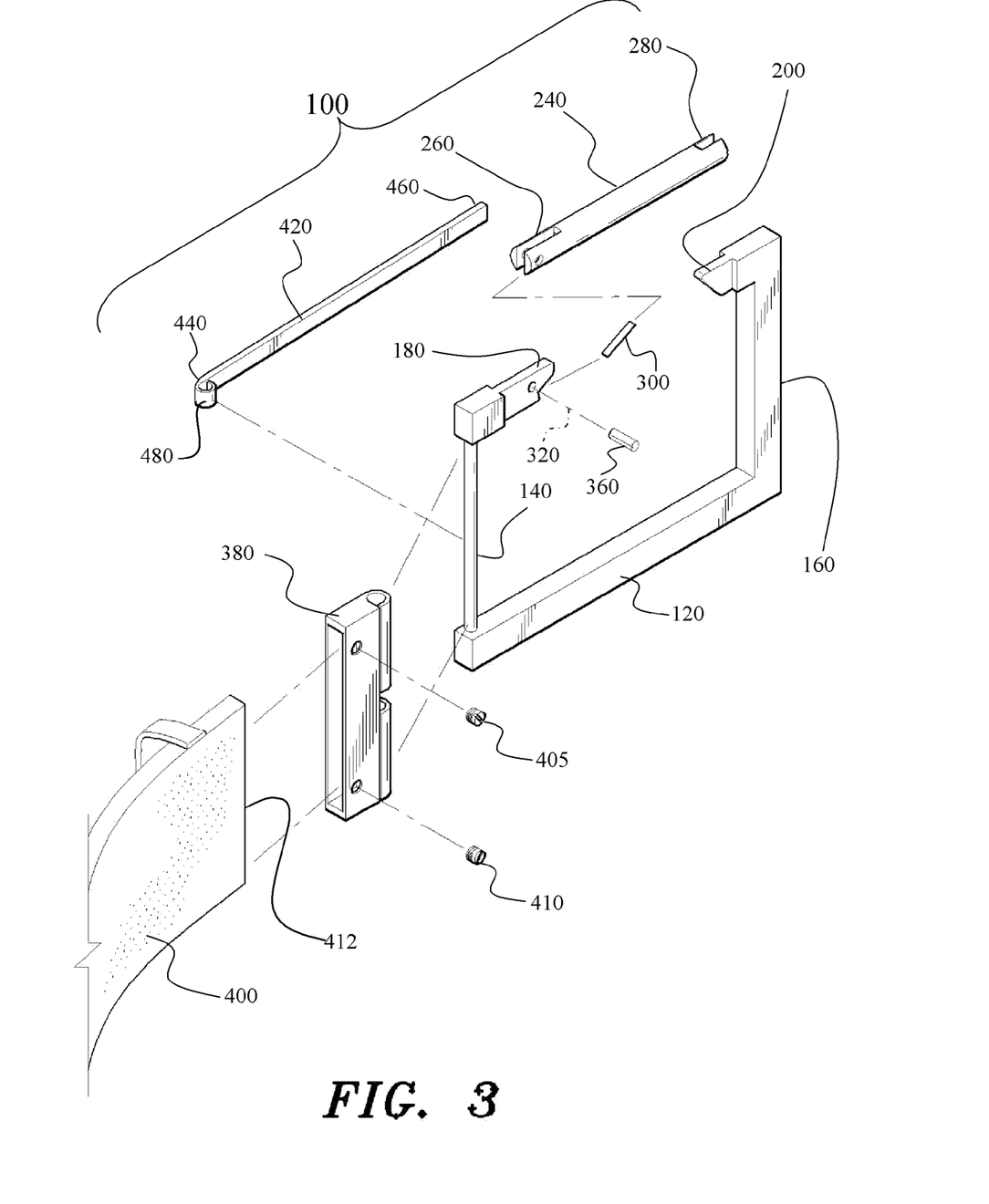
FIG. 3 is an exploded view of the buckle shown in FIG. 1.
Figure 3A:
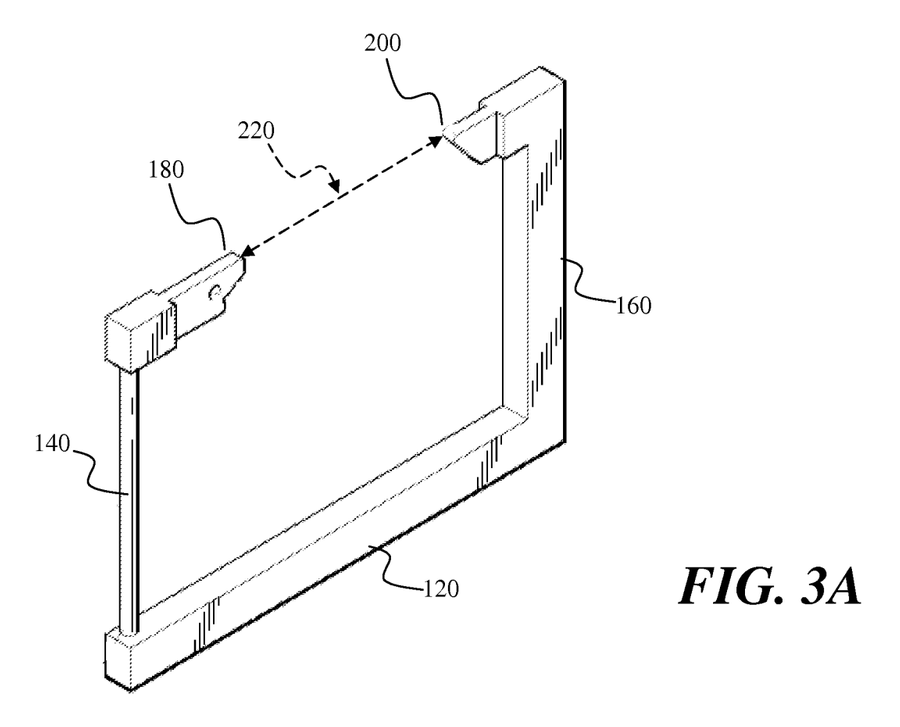
FIG. 3A shows part of the buckle shown in FIG. 1.

The base component 380 can be secured to the belt 400 by any suitable means such as a pair of belt securing screws 405 and 410 (shown in FIG. 3). More specifically, the belt 400 defines first and second opposite belt ends 412 and 414, respectively. The base component 400 is secured to the first belt end 412 (see, e.g., FIGS. 1 and 2). The buckle 100 can be made and supplied as a separate item, for example, to a belt manufacturer for fitting to the end of a belt.

The buckle 100 further comprises a prong 420. The prong 420 defines first and second prong ends 440 and 460, respectively. The first prong end 440 is operably connected to the rear end 140 of buckle body 120 (see FIG. 3). The prong 420 extends outward from the rear end 140 towards the front end 160 of buckle body 120 such that the second end 460 of the prong 420 is capable of resting on the front end 160 of the buckle body 120. The first end 440 of prong 420 defines a prong twirl 480 (shown in FIG. 3). The prong twirl 480 is shaped to connect the prong 420 to the rear end 140 of buckle body 120. The prong twirl is shown in FIG. 3. The gate 240 is substantially parallel to the prong 420 when the gate 420 is in its closed position as shown, for example, in FIG. 1.

Figure 4:
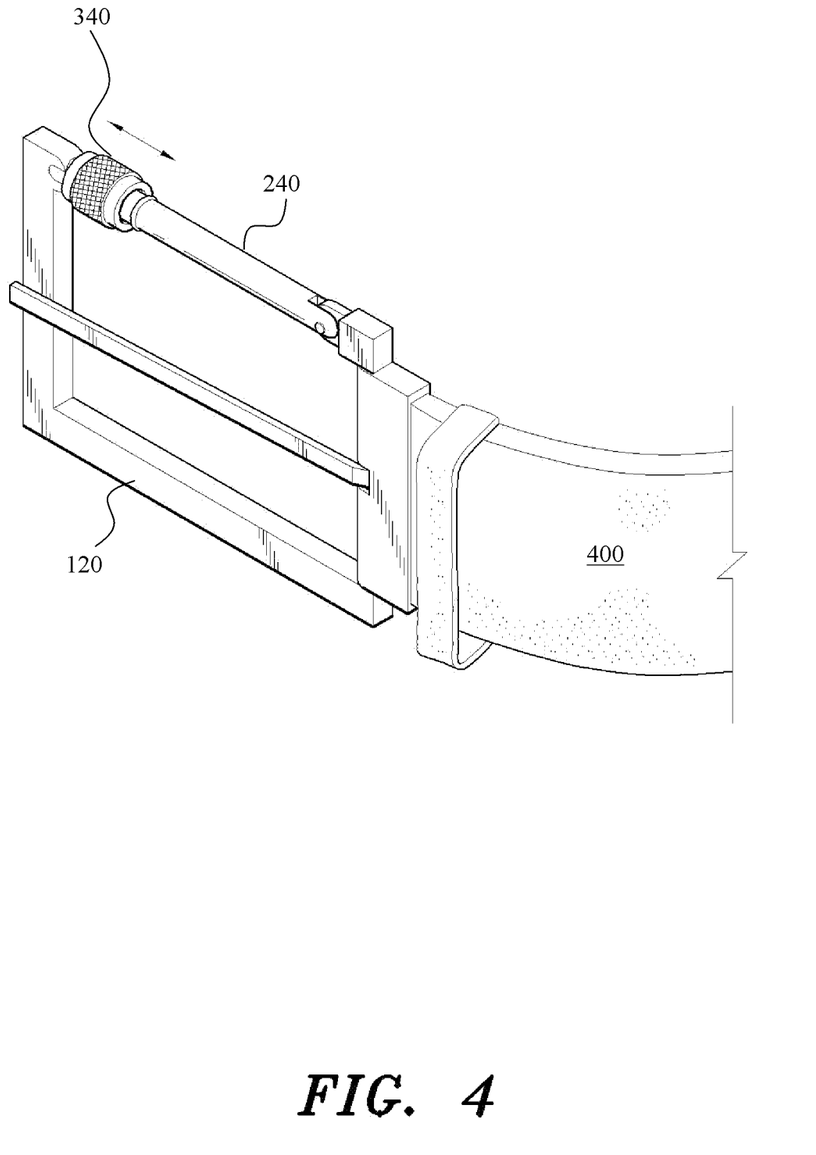
FIG. 4 is an environmental perspective view of a buckle fitted with a locking sleeve according to the present invention.
Figure 5:
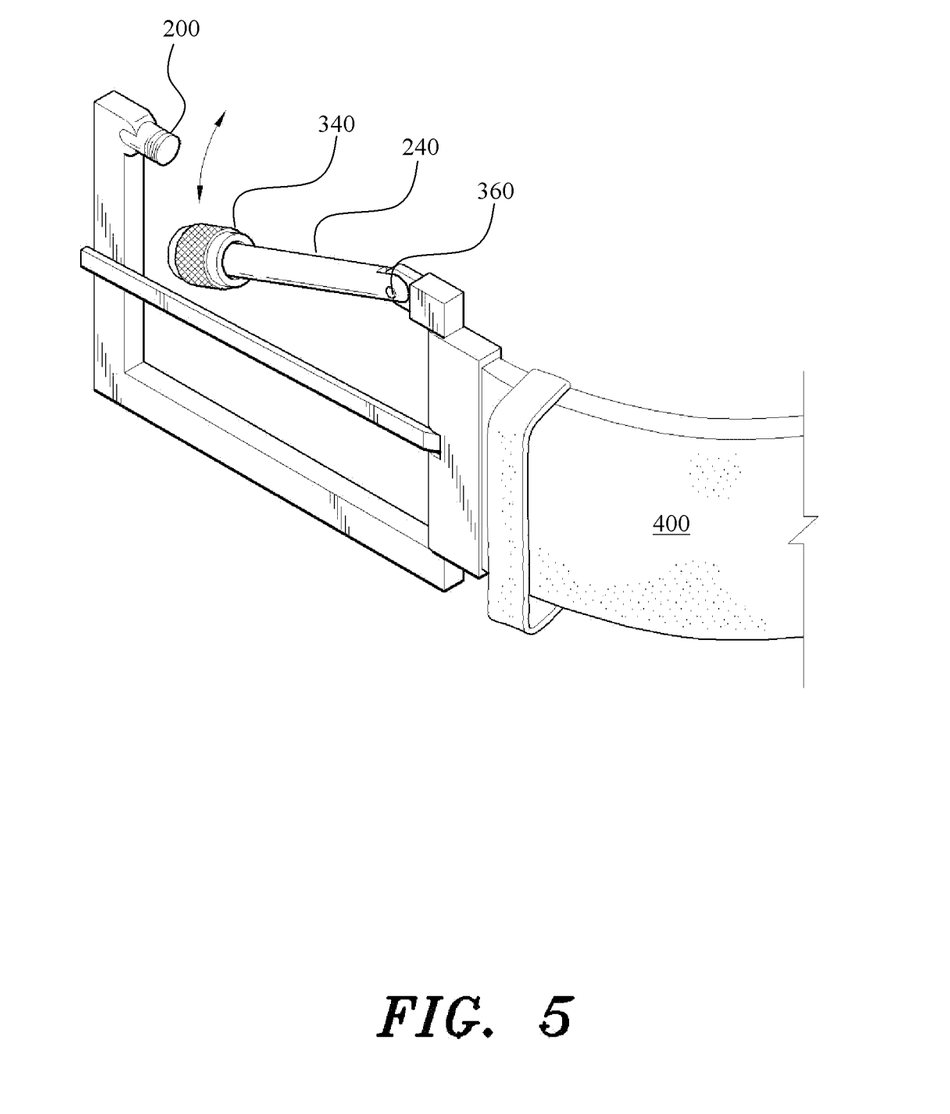
FIG. 5 shows the buckle of FIG. 4 with an open gate.

Referring to FIGS. 4 and 5, a locking sleeve 340 can be used in addition to or in place of spring 300.

Figure 6:
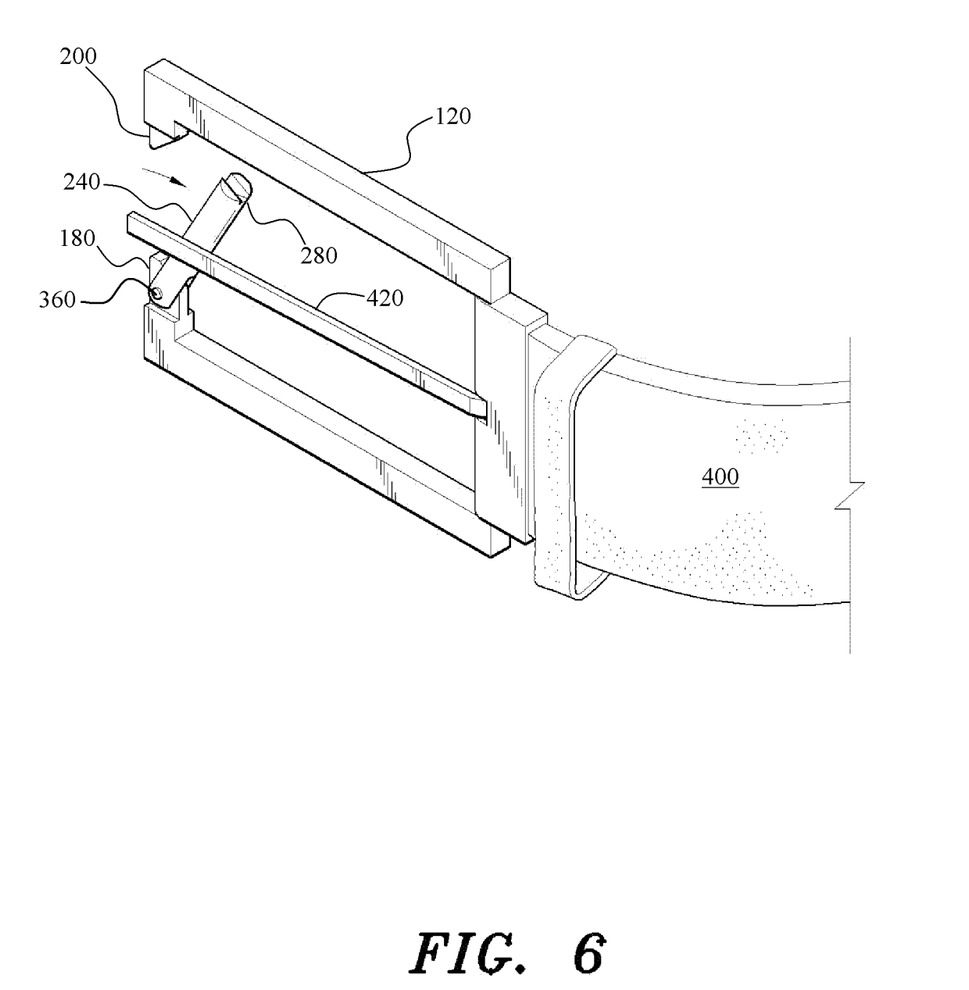
FIG. 6 is a perspective view of a buckle according to the present invention.

Referring to FIG. 6, the gate 240 can be integrated into any suitable side of the buckle body 120 such as the front end 160 as shown in FIG. 6; in this embodiment one end of the prong 420 rests against the middle portion of the gate 240 when the gate 240 is in a closed position with respect to buckle body 120. In this embodiment, the gate 240 is substantially normal (perpendicular) to the prong 420 when the gate 240 is in a closed position.

Figure 7:
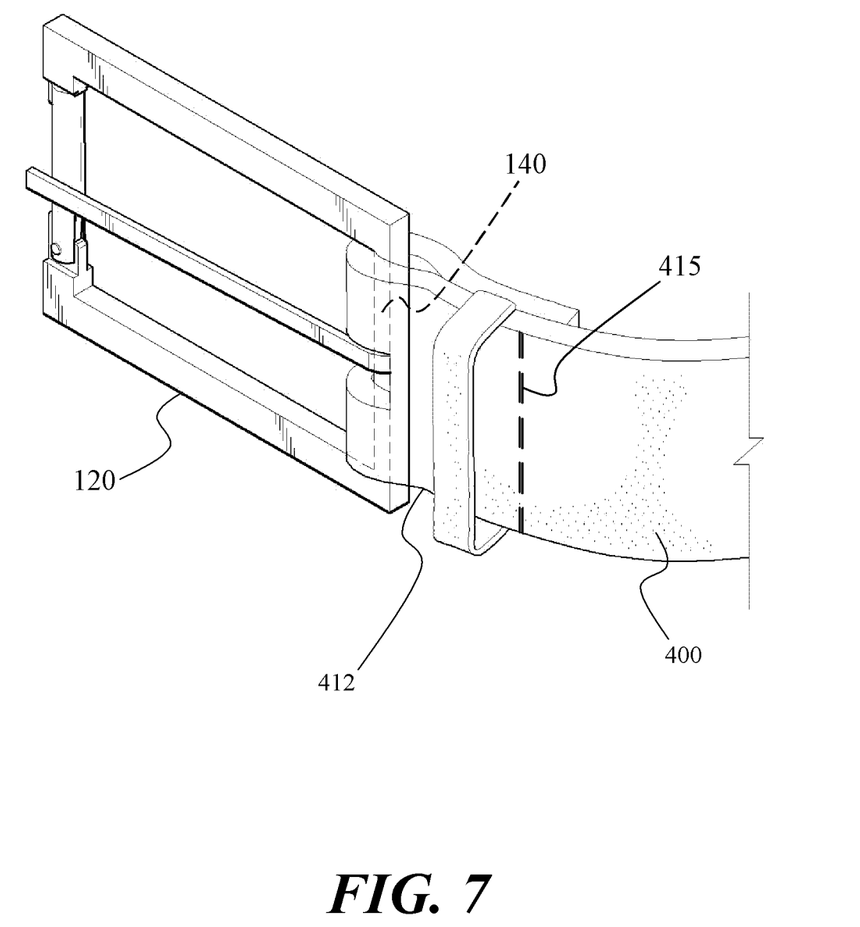
FIG. 7 is a perspective view of a buckle according to the present invention.

Referring to FIG. 7, it should be understood that the belt 400 can be directly connected to the rear end 140 of buckle body 120 thus rendering base component 380 optional. The end 412 of the belt 400, which may be a leather belt or strap, can be secured around rear end 140 of buckle body 120 by any suitable means such as stitches 415 and/or adhesive.

It should be understood that the buckle body 120 can be any suitable shape. For example, in FIG. 3A the overall shape of the buckle body 120 is rectangular, but the buckle body 120 can, for example, have an overall oval shape or any stylistic shape such as the shape of a heart. The buckle body can have a regular shape or irregular overall shape; for example, the buckle body 120 can be an irregular polygonal shape or a regular polygonal shape such as a shape resembling a regular hexagonal shape. Thus, the buckle body 120 is expressly not limited to a rectangular shape.

It is to be understood that the present invention is not limited to the embodiments described above, but encompasses any and all embodiments within the scope of the following claims.

What is claimed:

1. A buckle, comprising:
  a buckle body, the buckle body comprising rear and front ends and further comprising first and second buckle body ends, wherein the first and second buckle body ends define a gap therebetween;
  a gate moveable between open and closed positions, the gate defining first and second gate ends, wherein when the gate is in the closed position the gate extends between the first and second buckle body ends;
  a means for pivotally mounting the first end of the gate to the first end of the buckle body;
  a means for holding the gate in a closed position against the second end of the buckle body;
  a base component, wherein the rear end of the buckle body is operably connected to the base component, wherein the base component comprises a means to attach the base component to a belt; and
  a prong having first and second prong ends, wherein the first prong end is operably connected to the rear end of the buckle body, wherein the prong extends outward from the rear end of the buckle body in the direction of the front end of the buckle body such that the second end of the prong is capable of resting on the front end of the buckle body.

2. The buckle according to claim 1 further comprising a belt having first and second belt ends, wherein the base component is attached to the first belt end.

3. The buckle according to claim 2, wherein the belt is a pants belt.

4. The buckle according to claim 2, wherein the belt is a dog collar.

5. The buckle according to claim 2, wherein the belt is a cat collar.

6. The buckle according to claim 1, wherein the means for holding the gate in a closed position against the second end of the buckle body is a biasing means for holding the gate in a closed position against the second end of the buckle body.

7. The buckle according to claim 2, wherein the means for holding the gate in a closed position against the second end of the buckle body is a spring.

8. The buckle according to claim 1, wherein the means for holding the gate in a closed position against the second end of the buckle body is a locking sleeve.

9. The buckle according to claim 1, wherein the means for pivotally mounting the first end of the gate to the first end of the buckle body comprises a pin.

10. The buckle according to claim 1, wherein the buckle body has the general shape of a rectangular C.

11. The buckle according to claim 1, wherein the gate is substantially parallel to the prong when the gate is in its closed position.

12. The buckle according to claim 1, wherein the gate is located in the front end of the buckle.

13. The buckle according to claim 12, wherein the gate is substantially normal to the prong when the gate is in its closed position.

14. A buckle, comprising:
  a buckle body, the buckle body comprising rear and front ends and further comprising first and second buckle body ends, wherein the first and second buckle body ends define a gap therebetween;
  a gate moveable between open and closed positions, the gate defining first and second gate ends, wherein when the gate is in the closed position the gate extends between the first and second buckle body ends;
  a means for pivotally mounting the first end of the gate to the first end of the buckle body;
  a means for holding the gate in a closed position against the second end of the buckle body; and
  a prong having first and second prong ends, wherein the first prong end is operably connected to the rear end of the buckle body, wherein the prong extends outward from the rear end of the buckle body in the direction of the front end of the buckle body such that the second end of the prong is capable of resting on the front end of the buckle body.

15. The buckle according to claim 14 further comprising a belt having first and second belt ends, wherein the rear end of the buckle body is directly attached to the first belt end.

16. The buckle according to claim 14, wherein the means for holding the gate in a closed position against the second end of the buckle body is a spring.

17. The buckle according to claim 14, wherein the means for holding the gate in a closed position against the second end of the buckle body is a locking sleeve.

18. The buckle according to claim 14, wherein the means for pivotally mounting the first end of the gate to the first end of the buckle body comprises a pin.

19. The buckle according to claim 14, wherein the buckle body has the general shape of a rectangular C.

20. The buckle according to claim 1, wherein the gate is substantially parallel to the prong when the gate is in its closed position.

* * * * *